（12) United States Patent
Najafi et al.

(10) Patent No.: US 8,640,213 B2
(45) Date of Patent: Jan. 28, 2014

(54) METHOD AND SYSTEM FOR AUTOMATIC AUTHENTICATION

(75) Inventors: Maryam Najafi, San Jose, CA (US); Alexander Antido Cayetano, San Jose, CA (US); Len Osamu Toyoshiba, San Jose, CA (US); Shirley Lee, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 169 days.

(21) Appl. No.: 13/206,360

(22) Filed: Aug. 9, 2011

(65) Prior Publication Data

US 2013/0042310 A1    Feb. 14, 2013

Related U.S. Application Data

(60) Provisional application No. 61/440,310, filed on Feb. 7, 2011, provisional application No. 61/440,316, filed on Feb. 7, 2011.

(51) Int. Cl.
    *G06F 21/00*    (2013.01)
(52) U.S. Cl.
    USPC ........ 726/7; 726/5; 726/6; 713/155; 713/184; 709/248; 455/411; 705/44

(58) Field of Classification Search
    USPC .......................................... 726/5–7
    See application file for complete search history.

(56) References Cited

U.S. PATENT DOCUMENTS

| 2003/0212894 | A1* | 11/2003 | Buck et al. ..................... 713/184 |
| 2010/0043062 | A1* | 2/2010 | Alexander et al. ................ 726/6 |
| 2010/0180328 | A1* | 7/2010 | Moas et al. ........................ 726/6 |
| 2010/0250497 | A1* | 9/2010 | Redlich et al. ................ 707/661 |
| 2010/0262542 | A1* | 10/2010 | Kranzley ......................... 705/44 |
| 2010/0299731 | A1* | 11/2010 | Atkinson .......................... 726/6 |
| 2011/0145899 | A1* | 6/2011 | Cao et al. .......................... 726/7 |
| 2011/0265149 | A1* | 10/2011 | Ganesan ............................ 726/4 |
| 2012/0144461 | A1* | 6/2012 | Rathbun ............................ 726/5 |
| 2013/0024925 | A1* | 1/2013 | Venkataramani ................. 726/7 |

* cited by examiner

*Primary Examiner* — Morshed Mehedi
(74) *Attorney, Agent, or Firm* — Lowenstein Sandler LLP

(57) ABSTRACT

A system and method for automatic authentication includes automatically calculating a security code on a computer running a security program. The security program resides on the same computer as a web browser. In response to a user signing into a web based account on a web site accessed by the web browser, automatically verifying that the security program is registered with the web based account. In response to a second factor security code entry request on the web based account, automatically entering the security code into the web based account. The security code is transmitted to the web site transparently to the user for login.

17 Claims, 16 Drawing Sheets

400

User hovers over copy icon for Credential ID to highlight ID in blue

User hovers over copy icon for Security Code to highlight Security Code in blue User clicks on copy icon for Credential ID to display "Copy" text label to the right side of the arrow User clicks on copy icon for Security Code to display "Copy" text label to the right side of the arrow

METHOD AND SYSTEM FOR AUTOMATIC AUTHENTICATION

CROSS-REFERENCE TO RELATED APPLICATION

This application claims the benefit of U.S. Provisional Application No. 61/440,310, filed Feb. 7, 2011, and U.S. Provisional Application No. 61/440,316, filed Feb. 7, 2011.

FIELD

Embodiments according to the present invention generally relate to computer systems, in particular to online account authentication.

BACKGROUND

Typically, users log into accounts using a user name and password. For example, a user may use a web browser to log into their bank account information. The bank's web page requests the user's name and password, and then grants access to the user's account if the correct information is provided.

Unfortunately, users' names and passwords are compromised every day. Thieves, e.g. hackers, may steal names and passwords directly from a user's computer or from user information stored by corporations, e.g. banks, etc. Sometimes users use the same user name and password for many or all of their online accounts. In such cases, a thief need only trick an unsuspecting user into establishing a bogus account on a thief's counterfeit web site. When the user creates the account, the thief is given the user's name and password, and the thief now has access to all of the user's online accounts.

One solution to the problem is for users to authenticate their accounts using a physical dongle device, e.g. an authenticator. An authenticator is a second factor credential device that periodically calculates a unique code. The user reads the code from the authenticator, and enters the code along with their user name and password.

For example, a user may navigate to their bank's log in web page. The bank requests a user name, password, and authenticator code. The user enters their user name, password, and then copies the authenticator code from the authenticator dongle device onto the computer. The authenticator code is only good for one use and for a limited time. After the user uses the code or after some time has expired, the user must wait, e.g. 30 seconds, for the authenticator to generate a new code.

Use of a separate authenticator device can be problematic and user inconvenient. The authenticator is a separate device from the computer, e.g. a keychain attachment or cell phone running a mobile authenticator application, etc. If the keychain attachment or cell phone is lost, damaged, or stolen, the user cannot authenticate and log on to their account. This leads to IT support calls and user downtime in order to remove the lost authenticator from the user's account and add a new authenticator.

SUMMARY

Embodiments of the present invention are directed to a method and system for automatic authentication. The automatic authentication system of the present invention automatically enters a code generated by an authenticator, without the need for the user to copy the code from a separate authenticator device. The automatic authentication program runs on a user's computer along with, for instance, a web browser. When the user navigates to a web site using the web browser, the automatic authentication program may automatically transmit the code generated by the automatic authentication program to the web site. This may occur transparently to the user.

In one embodiment, a method of authenticating a user includes: automatically calculating a security code on a computer running a security program; in response to a user signing into a web based account, automatically verifying that the security program is registered with the web based account; and in response to a second factor security code entry request on the web based account, automatically entering the security code into the web based account.

In some embodiments the security program periodically calculates the security code. In further embodiments, the automatically entering occurs after the user has provided a user name and a user password.

In various embodiments, the web based account is accessed with a browser running on the computer, and the method further includes automatically monitoring activity of the browser. In some embodiments, the method of authenticating a user includes maintaining a list of web pages that generate the second factor security code entry request, and prompting the user to register the security program with unregistered web based accounts.

In one embodiment, the method of authenticating a user includes maintaining a list of web sites that generate the second factor security code entry request, and for a particular web site, automatically determining a web page that generates the second factor security code entry request. In another embodiment, the method of authenticating a user includes, in response to a failure of the automatically entering the security code, prompting the user to manually enter the security code.

In another embodiment, a method of authenticating a login attempt includes: automatically generating a security code within a first program running on a computer; and automatically entering the security code into a user initiated login attempt, wherein the user initiated login attempt occurs within a second program running on the computer.

In some embodiments the first program periodically generates a new security code. In further embodiments, the automatically entering occurs in response to a user providing a user name and a user password.

In various embodiments, the second program is a web browser, and the method further includes automatically monitoring URLs a user enters into the web browser. In some embodiments the method of authenticating a login attempt includes maintaining a list of URLs that require the security code, and prompting a user to register the first program with unregistered URLs.

In one embodiment, the method of authenticating a login attempt includes maintaining a list of web sites within the first program that generate a security code request, and for a particular web site, automatically determining from the list a web page that generates the security code request. In various embodiments, the method of authenticating a login attempt includes, in response to a failure of the automatically entering the security code, prompting a user to manually enter the security code.

In another embodiment, a system is described including: a processor; a display; memory coupled to the processor, wherein the memory includes instructions that when executed cause the system to perform a method of authenticating a login attempt, the method including: automatically generating a security code within a first program running on a computer; in response to a user navigating to a URL within a second program running on the computer, automatically verifying that the first program is registered with the URL; and automatically transmitting the security code into a user initiated login attempt, wherein the user initiated login attempt occurs within the second program running on the computer.

In some system embodiments, the first program automatically generates a new security code periodically. In further system embodiments, the automatically transmitting occurs in response to the user providing a user name and a user password. In one system embodiment, the second program is a web browser, and the method further includes automatically monitoring URLs the user enters into the web browser.

In various system embodiments, the method further includes automatically searching the URL for a location that requires the security code. In one system embodiment, the method further includes, in response to a failure of the automatically transmitting the security code, prompting the user to manually enter the security code.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
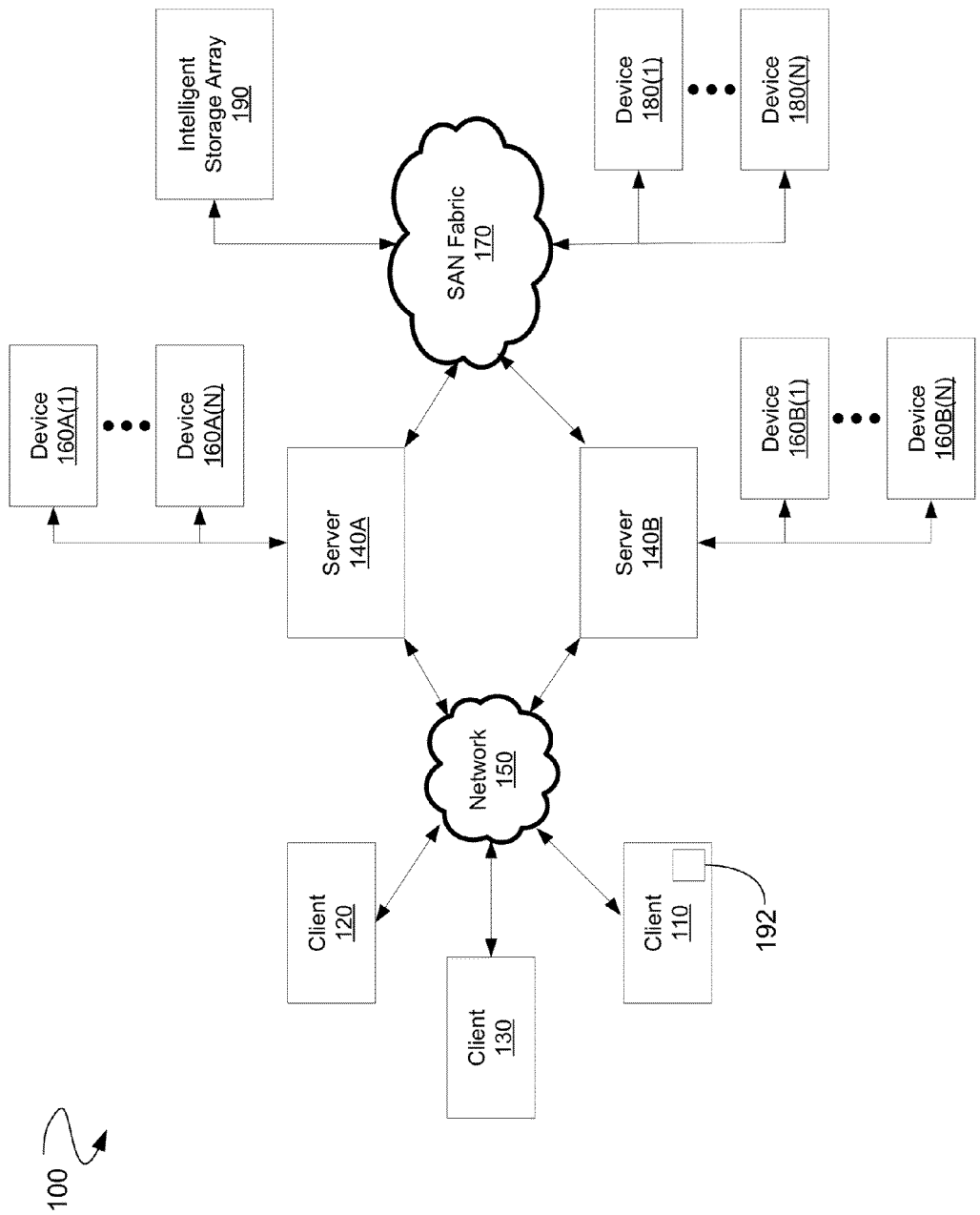
FIG. 1 is a block diagram depicting an exemplary network architecture that can serve as a platform for embodiments of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "connected" refers to communicatively coupling elements via a bus, wireless connection (wifi), Bluetooth, infrared, USB, Ethernet, FireWire, optical, PCI, DVI, etc.

FIG. 1 is an exemplary system in which embodiments of the present invention can be implemented for automatic authentication. FIG. 1 is a block diagram depicting a network architecture 100 in which client systems 110, 120, and 130, as well as storage servers 140A and 140B (any of which can be implemented using computer system 200 (FIG. 2)), are coupled to a network 150. Storage server 140A is further depicted as having storage devices 160A(1)-(N) directly attached, and storage server 140B is depicted with storage devices 160B(1)-(N) directly attached. Servers 140A and 140B may contain a plurality of files that may be shared among a plurality of users. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

With reference to computer system 200 (FIG. 2), modem 247 (FIG. 2), network interface 248 (FIG. 2), or some other method can be used to provide connectivity from each of client computer systems 110, 120, and 130 to network 150. Client systems 110, 120, and 130 of FIG. 1 are able to access information on storage server 140A or 140B using, for example, a web browser or other client software (not shown). Such a client allows client systems 110, 120, and 130 to access data hosted by storage server 140A or 140B or one of storage devices 160A(1)-(N), 160B(1)-(N), 180(1)-(N), or intelligent storage array 190. FIG. 1 depicts the use of a network such as the Internet or exchanging data, but the embodiments of the present invention are not limited to the Internet or any particular network-based environment. In the present embodiments, a method of automatic authentication 192 may be performed in one of the client computer systems 110, 130, and 130. However, the method of automatic authentication 192 is not limited to the client computer systems 110, 130, and 130, and may also operate within, for example, storage server 140A or 140B. In addition, the method of automatic authentication 192 may also operate within cloud computing environments.

Figure 2:
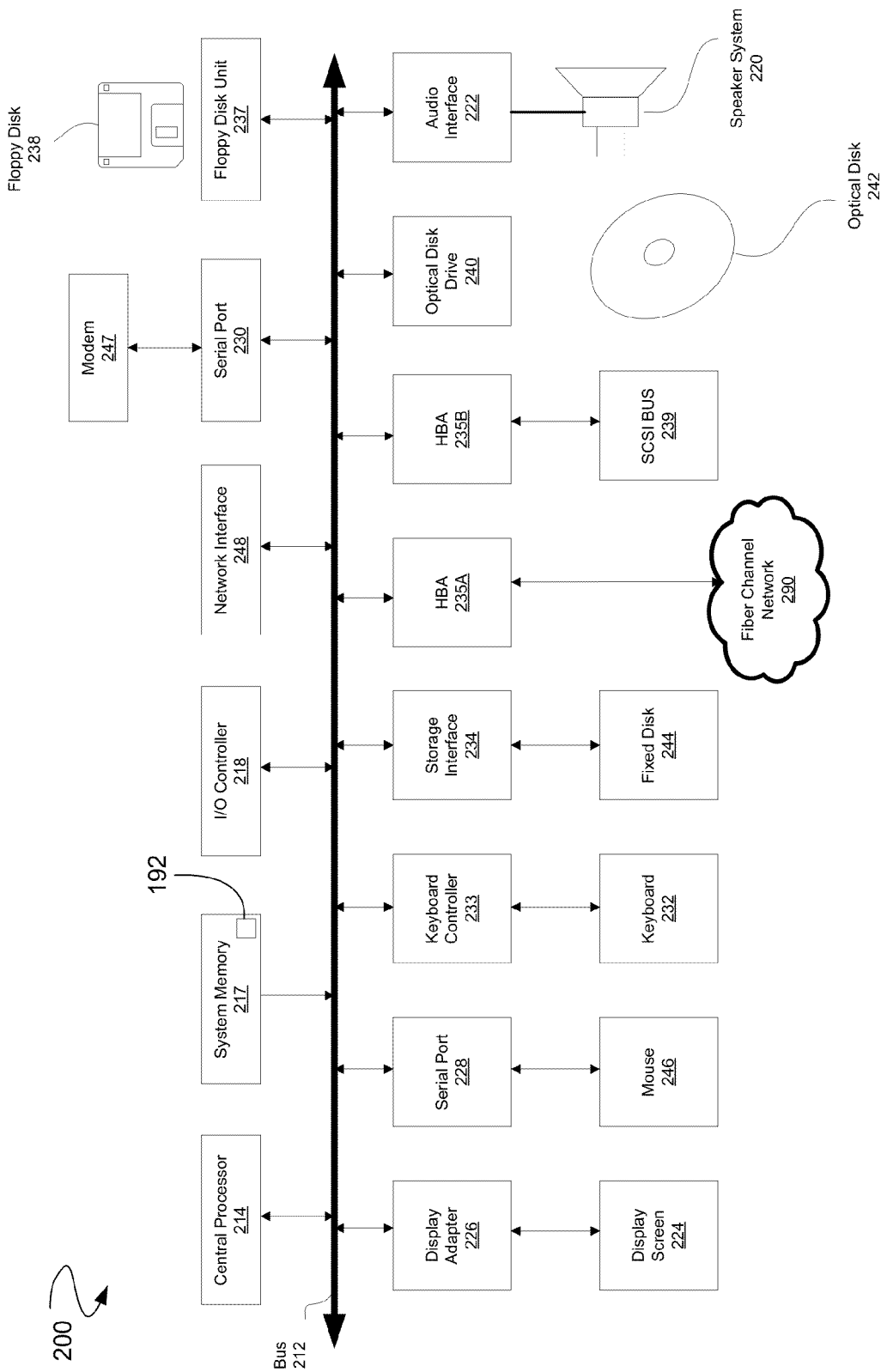
FIG. 2 is a block diagram depicting a computer system suitable for implementing embodiments of the present invention.

FIG. 2 depicts a block diagram of a computer system 200 suitable for implementing embodiments of the present invention. In the discussion to follow, various and numerous components and elements are described. Various combinations and subsets of those components can be used to implement the devices mentioned in conjunction with FIG. 1. For example, client systems 110, 120, and 130 may each be a full-function computer system that employs many, if not all, of the features of the computer system 200. However, the servers 140A and 140B may utilize only the subset of those features needed to support the functionality provided by those devices. For example, the servers 140A and 140B may not need a keyboard or display, and may execute a relatively sparse operating system that supports the functionality of data storage and data access and the management of such functionality.

Computer system 200 of FIG. 2 includes a bus 212 which interconnects major subsystems of computer system 200, such as a central processor 214, a system memory 217 (typically RAM, but which may also include ROM, flash RAM, or the like), an input/output controller 218, an optional external audio device, such as a speaker system 220 via an audio output interface 222, an optional external device, such as a display screen 224 via display adapter 226, serial ports 228 and 230, an optional keyboard 232 (interfaced with a keyboard controller 233), an optional storage interface 234, an optional floppy disk unit 237 operative to receive a floppy disk 238, an optional host bus adapter (HBA) interface card 235A operative to connect with a Fibre Channel network 290, an optional host bus adapter (HBA) interface card 235B operative to connect to a SCSI bus 239, and an optional optical disk drive 240 operative to receive an optical disk 242. Also, optionally included can be a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 200 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or network interface 248. In the current embodiment, the system memory 217 comprises instructions that when executed cause the system to perform the method of automatic authentication 192.

Storage interface 234, as with the other storage interfaces of computer system 200, can connect to a standard computer readable medium for storage and/or retrieval of information, such as fixed disk drive 244. Fixed disk drive 244 may be part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Method and System for Automatic Authentication

Figure 3:
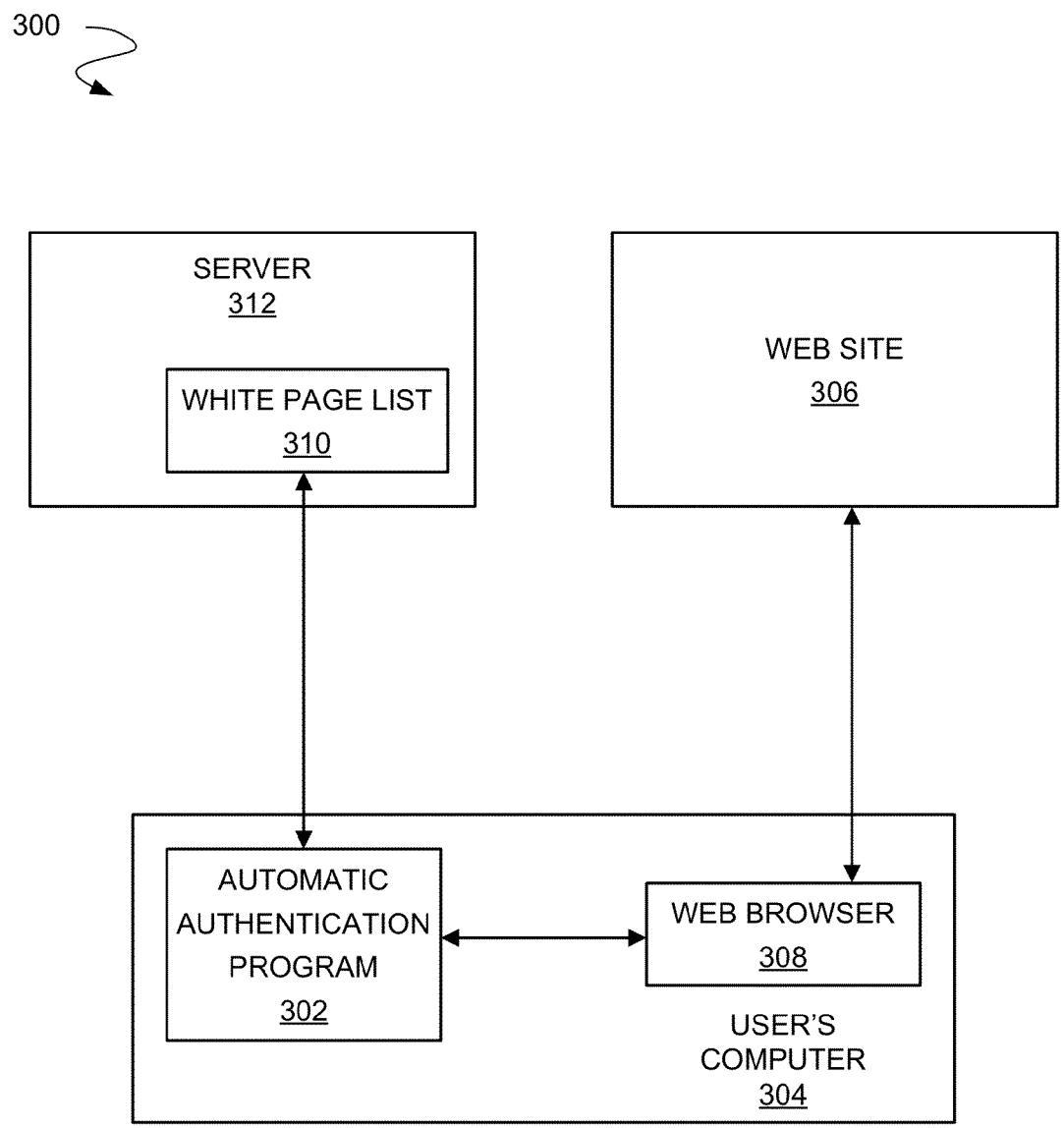
FIG. 3 is a block diagram depicting software or programmable modules within an exemplary automatic authentication system, according to an embodiment of the present invention.

FIG. 3 depicts a block diagram of an automatic authentication system 300, according to an exemplary embodiment of the present invention. Embodiments of the present invention enable automatic authentication without the use of a separate authentication code generating device, e.g. a physical dongle device or a mobile application running on a smart phone.

Some accounts, e.g. web based accounts, require second factor credentials in addition to a user name and password. An authenticator is a second factor credential device that periodically generates a unique code applicable for a user. For example, an authenticator may generate a new code, e.g. a numerical code, every thirty seconds. The code may be calculated by a formula that includes the present time and the authenticator's unique serial number. The code may be only good for a limited time, e.g. forty five seconds, and may only be good for a limited number of uses, e.g. one use.

The user must first register the authenticator with the account. Registration may include providing the authenticator's unique serial number as well as additional information, e.g. the account and the authenticator may need to be time synched. After registration, the account, e.g. web site, and the authenticator will calculate the same code at the same time. Therefore, when the user enters the code from the user's authenticator, the user's code matches the code calculated by the account, and the user is allowed access to the account.

The automatic authentication system 300 of the present invention automatically enters the code generated by the authenticator, without the need for the user to copy the code from a separate authenticator device. In an embodiment an automatic authentication program 302 runs on a user's computer 304. When the user navigates to a web site 306 using a web browser 308, the automatic authentication program 302 may automatically transmit the code generated by the automatic authentication program 302 to the web site 306 during the login process.

In an embodiment, the automatic authentication program 302 may periodically download a list, e.g. a white page list 310, of web sites that require or have the option of enabling use of the automatic authentication program 302. In some embodiments, the white page list 310 may be stored on a server 312. The white page list 310 may also include the web page location in the web site 306 where the code generated by the automatic authentication program 302 needs to be entered. In various embodiments, if an unidentified web site is not listed in the white page list 310, the automatic authentication program 302 may search, e.g. by automatically crawling or scraping, the unidentified web site in order to determine if and where authentication is required. In further embodiments, an Enterprise mode may enable administrators within a company to specify their own white page list for intranet sites.

It will be appreciated that the exemplary embodiment of the automatic authentication system 300 is only an example of many uses for the automatic authentication program 302 in accordance with embodiments of the present invention. Embodiments of the present invention can be used in any case where authentication needs to be automatic. For example in addition to increasing user convenience, embodiments of the present invention can also be used for visually impaired users, thus supporting 508 compliance.

Figure 4:
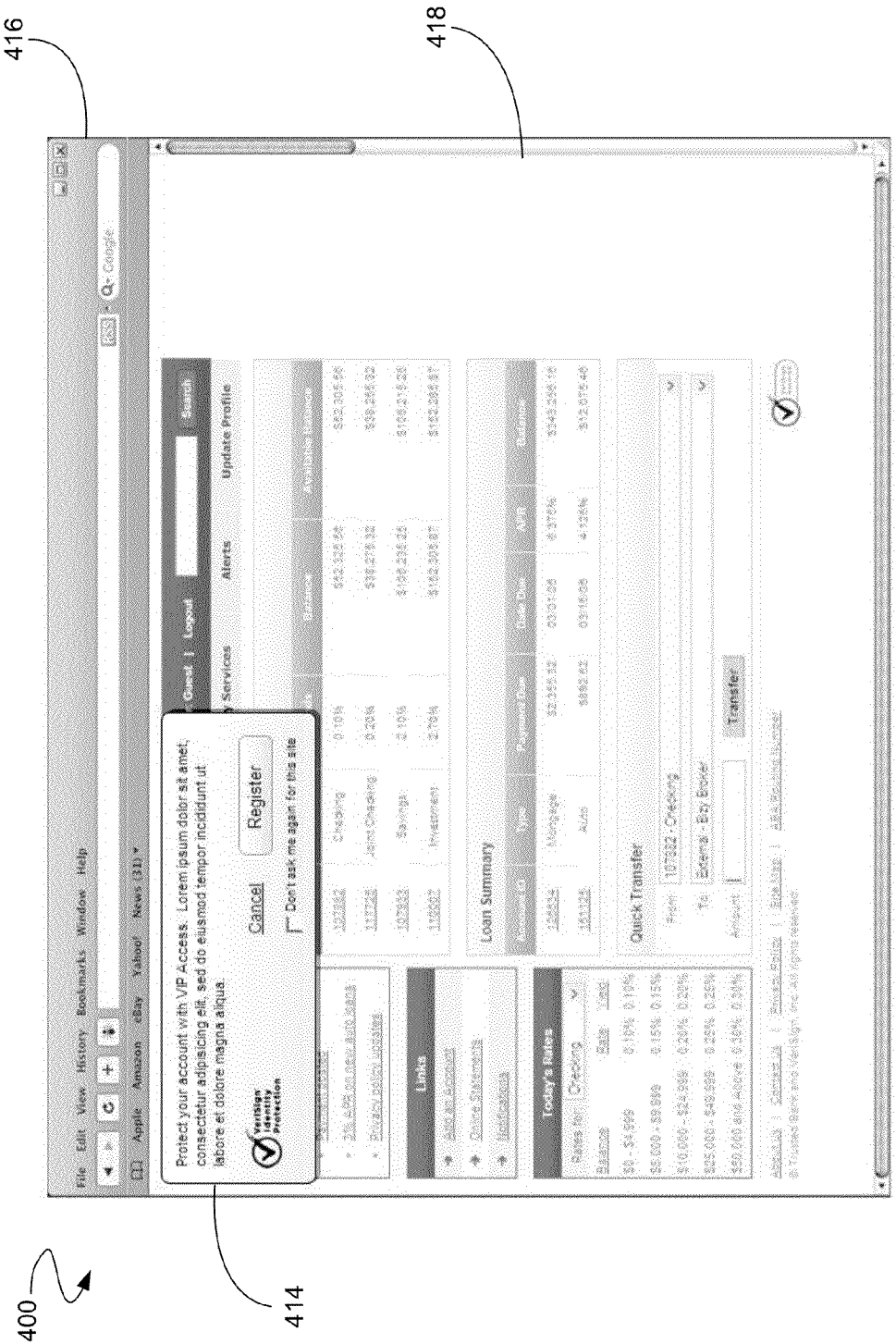
FIG. 4 depicts an exemplary on screen prompt of the automatic authentication system, according to an embodiment of the present invention.

FIG. 4 depicts an exemplary prompt 414 of the automatic authentication system 300 (FIG. 3), according to an embodiment of the present invention. In an embodiment, the automatic authentication program 302 (FIG. 3) may be VIP Desktop 400. VIP Desktop 400 is an application that is installed on a user's computer. In an embodiment, it generates a six digit security code every 30 seconds. VIP Desktop 400 is used for second factor authentication as an extra layer of security in addition to the user's username and password. In some embodiments, VIP Desktop 400 may be preinstalled by OEM manufacturers or the end user may install it themselves.

Once installed VIP Desktop 400 runs silently in the background and monitors the URLs the user enters into their browser 416. If a registered URL is used, security code entry may be automatic and transparent to the user. If an unregistered URL matches a VIP member site 418 based on a white list VIP Desktop maintains, VIP Desktop 400 activates and prompts, e.g. with the prompt 414, the user if they want to protect their login with VIP Desktop 400. If the user agrees, VIP Desktop 400 is registered to the user's account.

Figure 5:
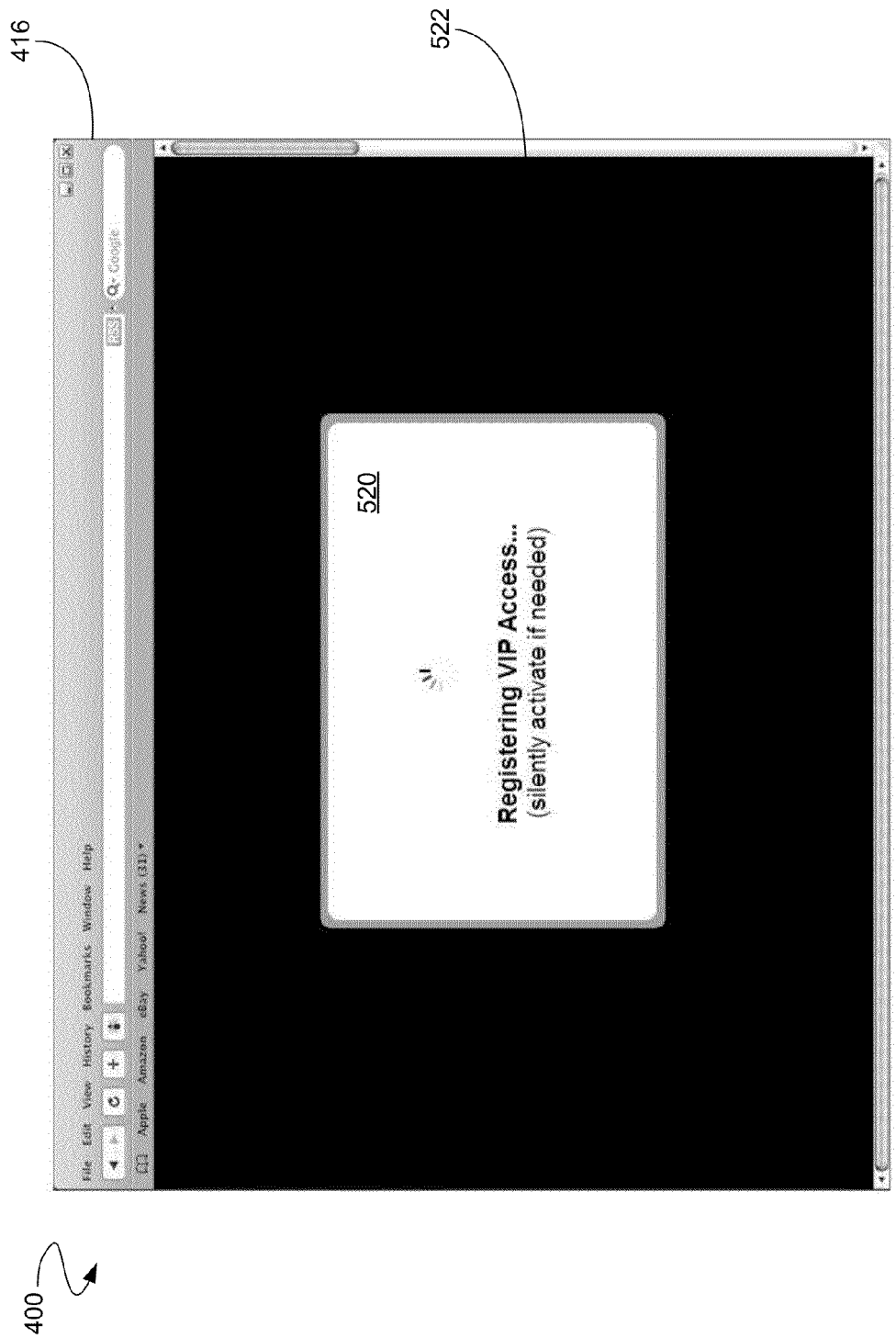
FIG. 5 depicts exemplary automatic registration of VIP Desktop in a browser, according to an embodiment of the present invention.

FIG. 5 depicts exemplary automatic registration 520 of VIP Desktop 400 in the browser 416, according to an embodiment of the present invention. In an embodiment, the automatic registration 520 may happen automatically if VIP Desktop 400 can navigate to a registration page 522 provided in the white page list 310 (FIG. 3) and auto-fill required information, e.g. credential ID, security code, etc. In an embodiment, this may happen transparently to the user if the white page list 310 (FIG. 3) contains the desired location. In some embodiments, once the automatic registration 520 is complete, the user is prompted to set up a backup VIP credential (see FIG. 7).

Figure 6:
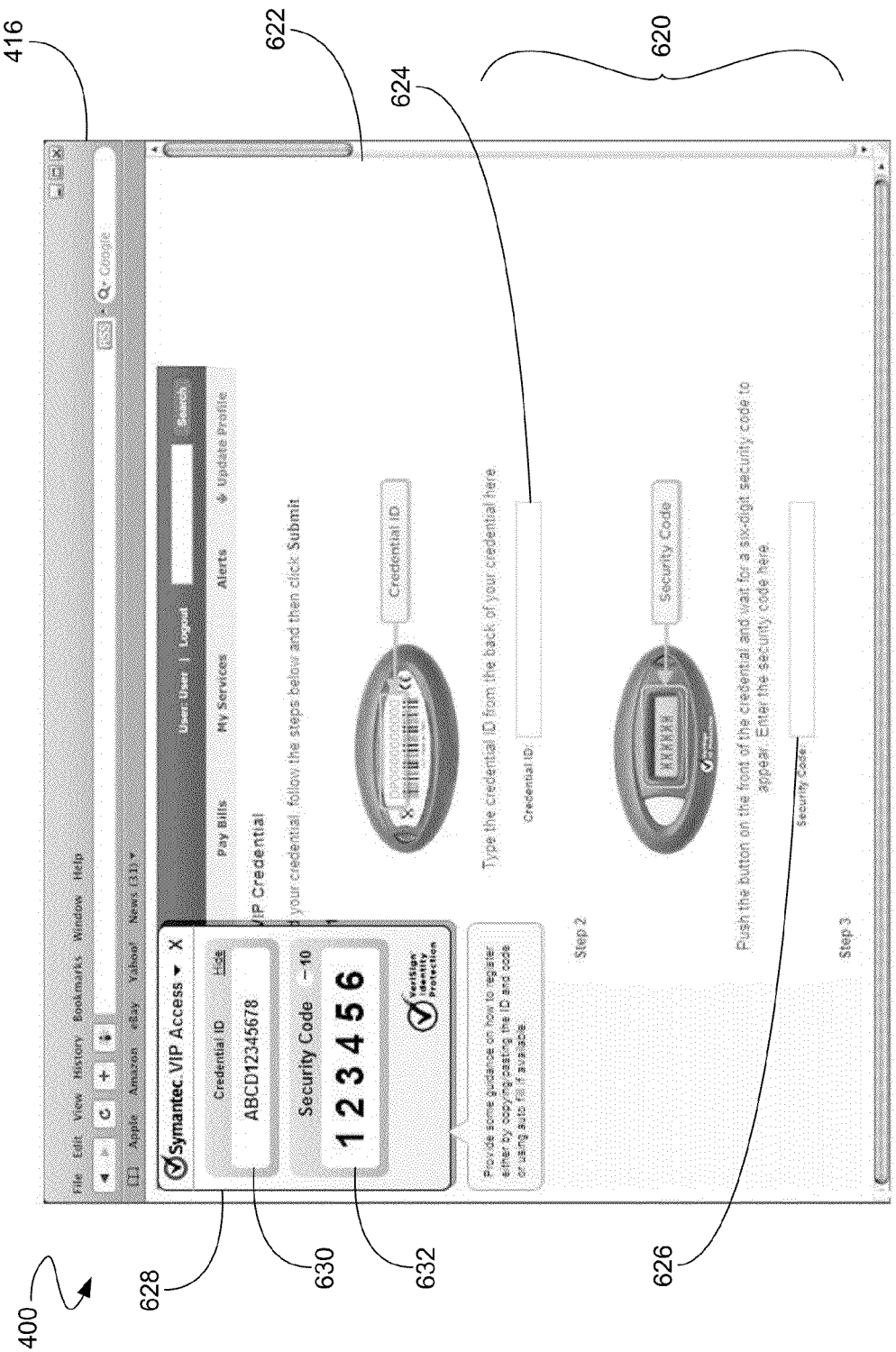
FIG. 6 depicts exemplary manual registration of VIP Desktop in the browser, according to an embodiment of the present invention.

FIG. 6 depicts exemplary manual registration 620 of VIP Desktop 400 in the browser 416, according to an embodiment of the present invention. In an embodiment, VIP Desktop 400 will not automatically register. Instead VIP Desktop 400 will display a manual registration page 622 with a credential ID field 624 and a security code field 626. In addition, the VIP Desktop will display a VIP credential window 628 with a credential ID 630 and a security code 632.

In an embodiment, the VIP Desktop 400 may instruct the user to manually enter the credential ID 630 into the credential ID field 624. In addition, the VIP Desktop 400 may instruct the user to manually enter the security code 632 into the security code field 626. After the credential ID 630 and the security code 632 have been copied into their respective fields, registration is complete, and the user may be prompted to set up a backup VIP credential (see FIG. 7).

Figure 7:
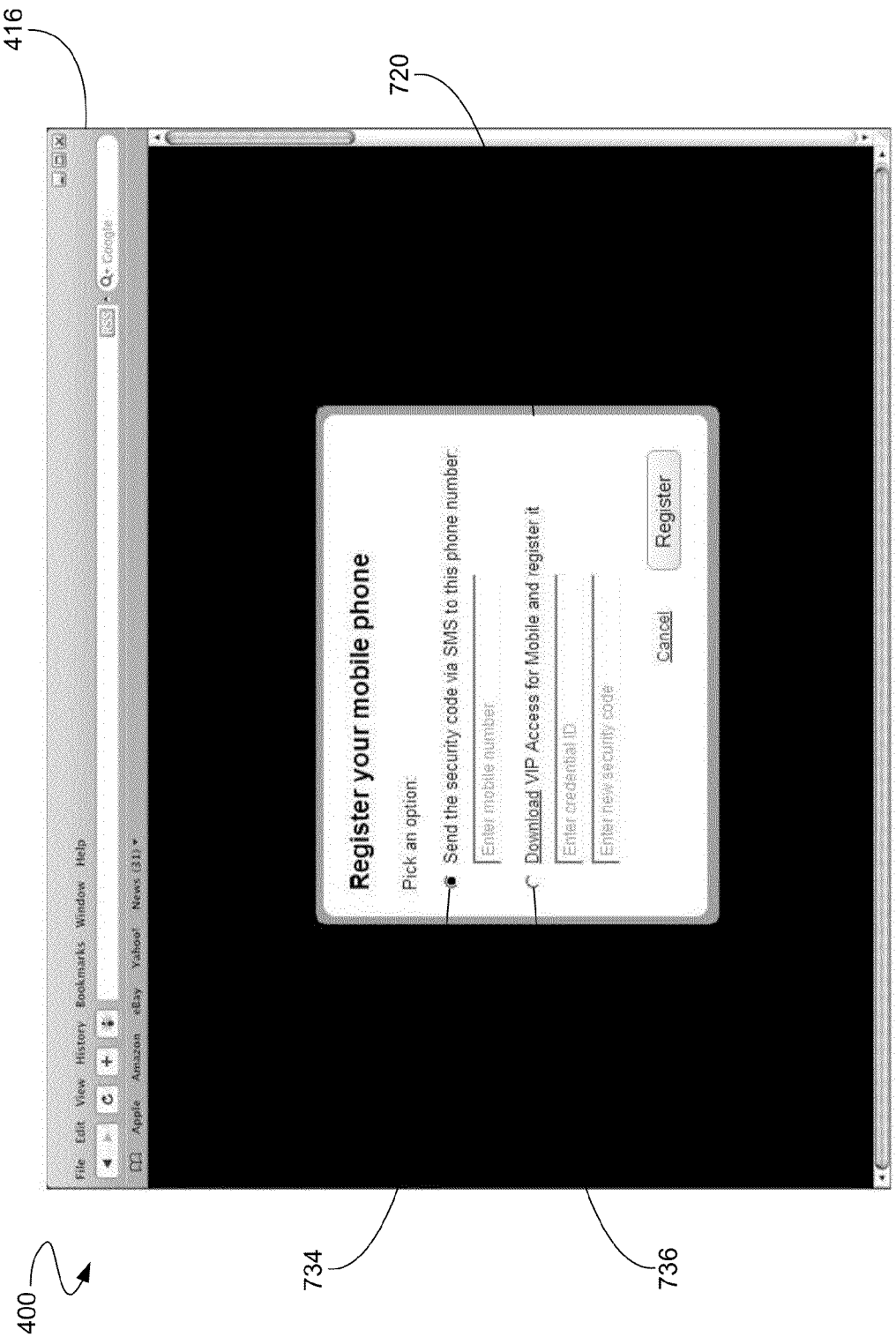
FIG. 7 depicts an exemplary backup credential registration of VIP Desktop in the browser, according to an embodiment of the present invention.

FIG. 7 depicts an exemplary backup credential registration 720 of VIP Desktop 400 in the browser 416, according to an embodiment of the present invention. Once the automatic registration 520 (FIG. 5) or the manual registration (FIG. 6) is complete, the user may be prompted to set up the backup credential registration 720, for example using SMS or a mobile VIP application, in case the user accesses their account from a computer that does not have VIP desktop 400 installed.

For example, the user may be prompted to select a SMS option 734 or a mobile VIP option 736. If the user selects the SMS option 734, the user may be asked to register a mobile phone number for SMS authentication. On the other hand, if the user selects the VIP option 736, the user may be asked to download and register a mobile VIP application for a mobile phone. Registration may include entering the credential ID for the mobile VIP application and a security code generated by the mobile VIP application.

Figure 8:
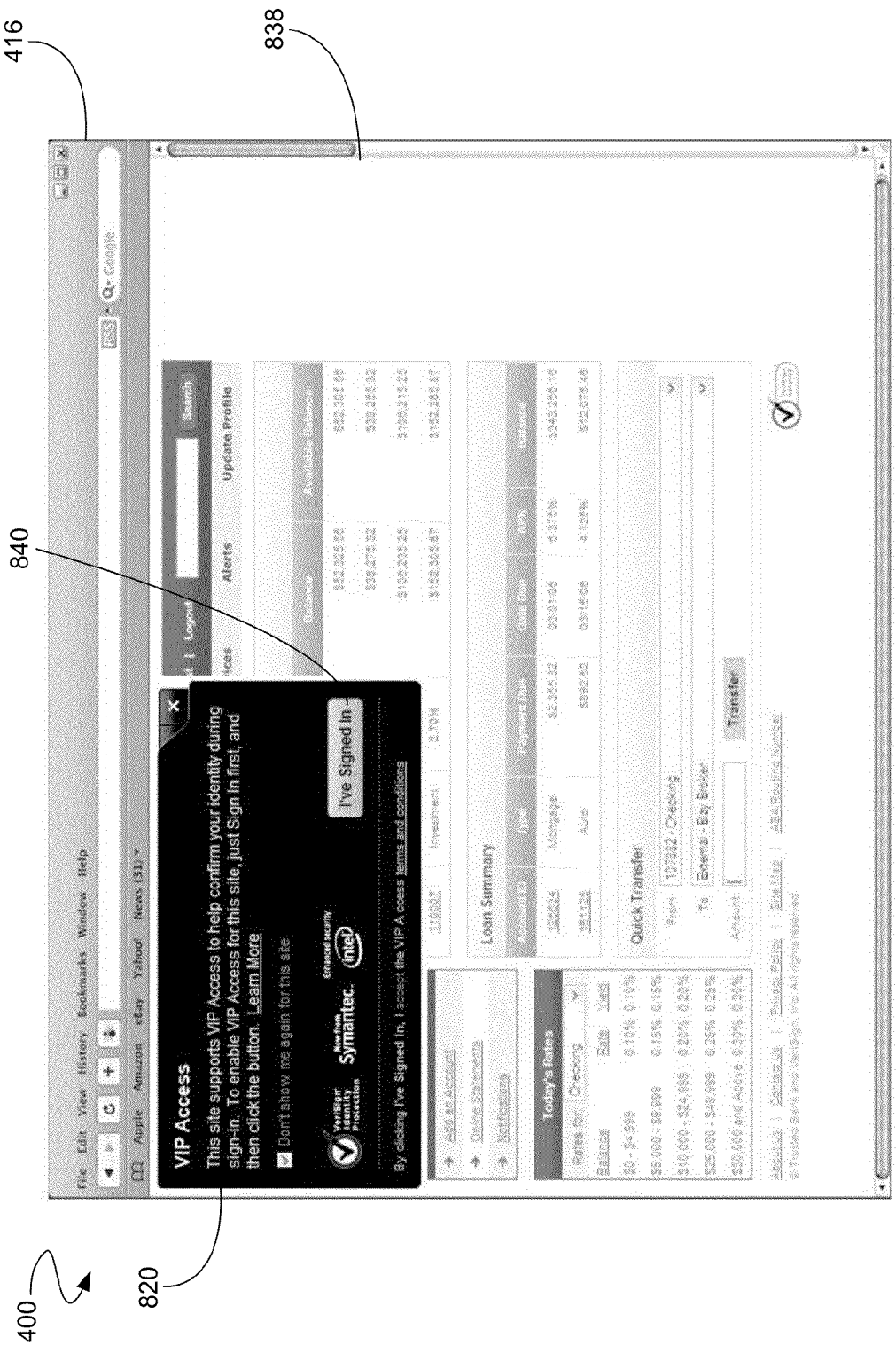
FIG. 8 depicts an exemplary sign in prompt of VIP Desktop in the browser, according to an embodiment of the present invention.

FIG. 8 depicts an exemplary sign in prompt 820 of VIP Desktop 400 in the browser 416, according to an embodiment of the present invention. In some embodiments VIP Desktop 400 may not be able to detect if the user is signed into a member site. Therefore, VIP Desktop 400 may prompt the user to protect their account on the member site's home page 838. The sign in prompt 820 instructs the user to sign in to their account and then acknowledge the sign in prompt 820.

After the user has acknowledged the sign in prompt 820, for example by clicking a button 840 labeled "I've Signed In," registration happens in a similar manner as described above. However in some embodiments, if the user does not want to register VIP Desktop 400, the user is reminded again the next time they visit the member site's home page 838.

Figure 9:
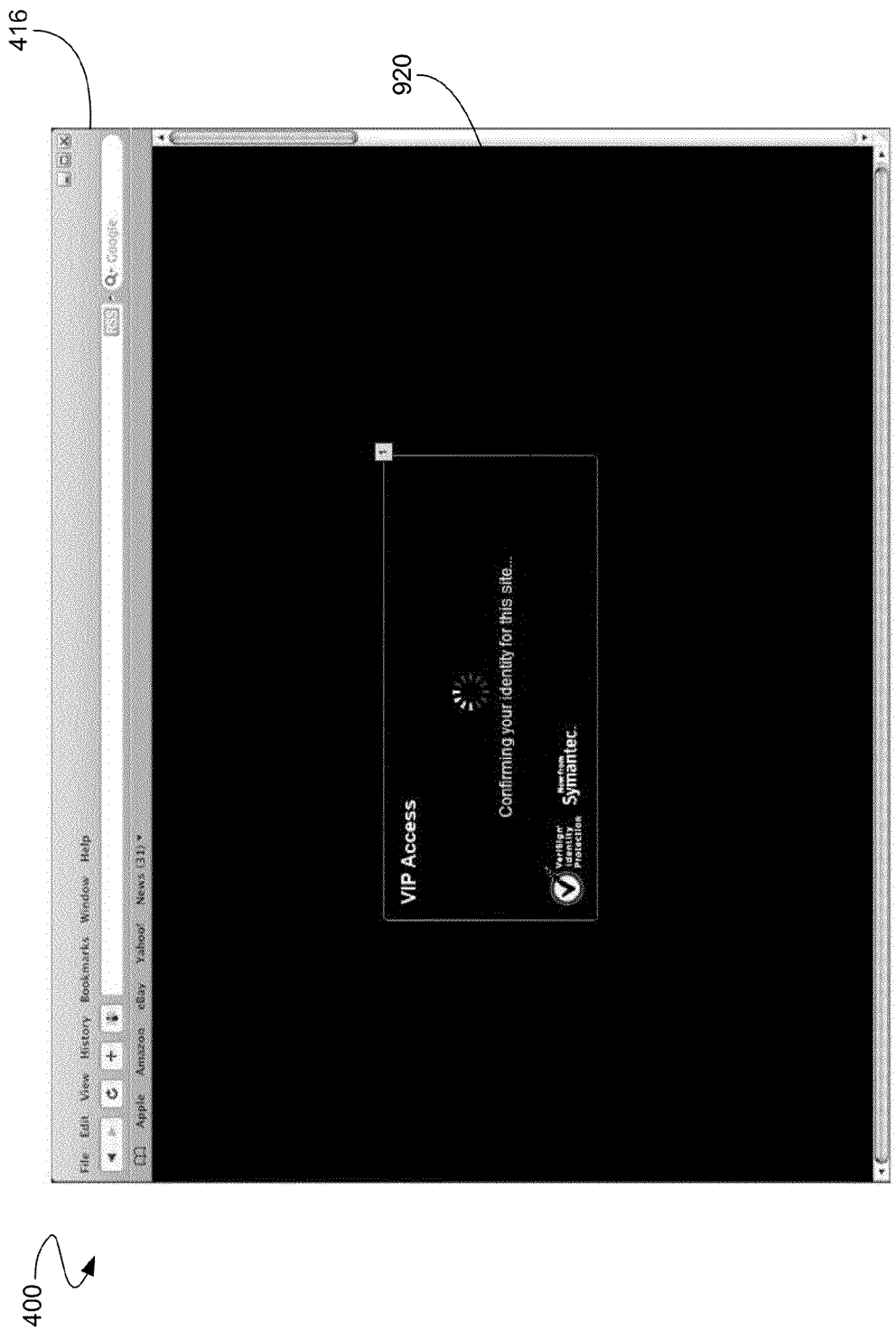
FIG. 9 depicts an exemplary automatic sign in of VIP Desktop in the browser, according to an embodiment of the present invention.

FIG. 9 depicts an exemplary automatic sign in 920 of VIP Desktop 400 in the browser 416, according to an embodiment of the present invention. Once VIP Desktop 400 is registered, the user's account is protected by VIP Desktop 400. The next time the user signs in to their account, VIP Desktop 400 detects that VIP Desktop 400 was already registered to the user's account. VIP Desktop 400 then waits for a second factor security code entry page provided, for example, in the white page list 310 (FIG. 3). If VIP Desktop 400 can auto-fill the security code into the security code entry page transparently to the user, automatic sign in 920 proceeds without the need for further user interaction. In various embodiments, VIP Desktop 400 may need to wait for the user to first enter the account's user name and password before providing the security code.

Figure 10:
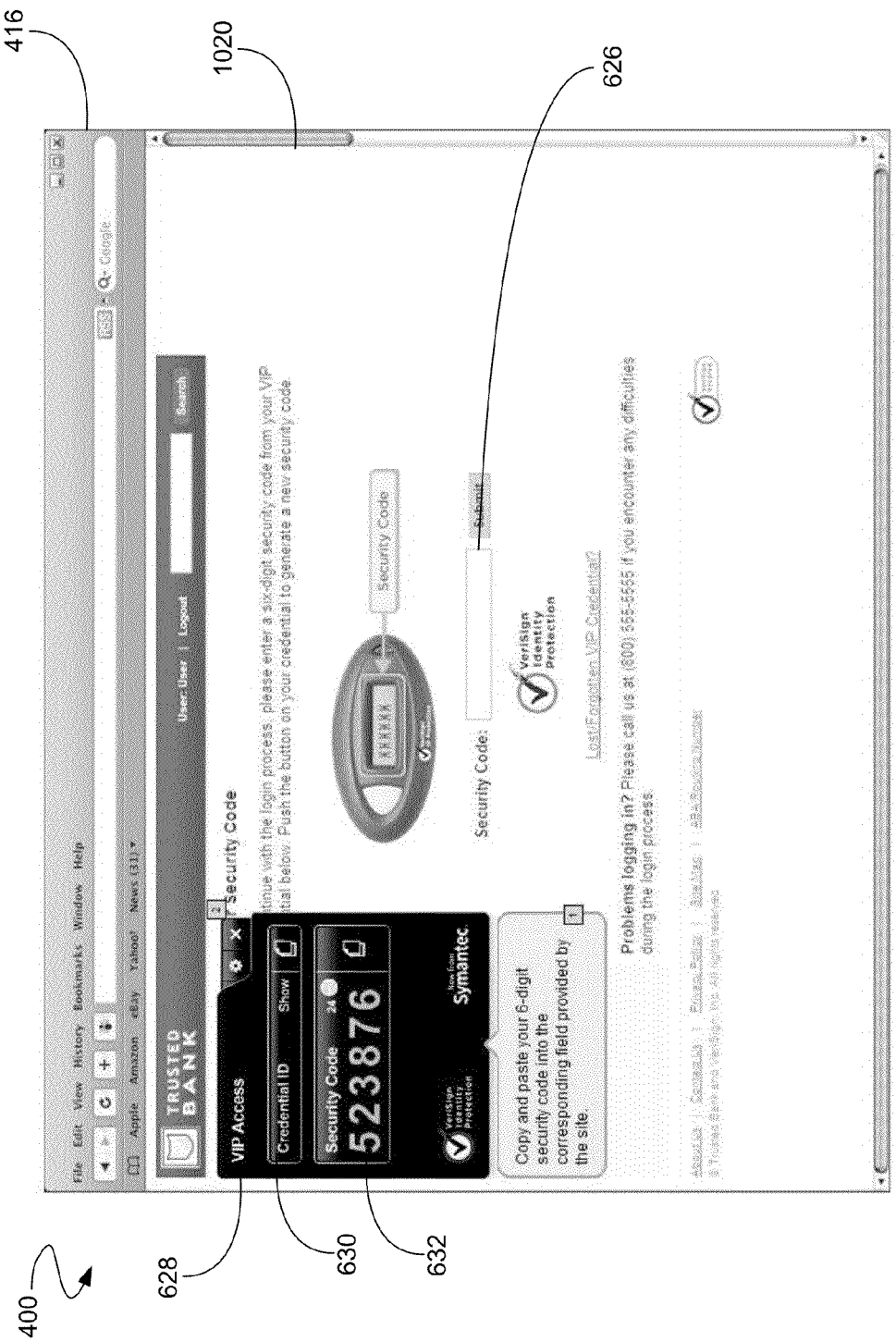
FIG. 10 depicts an exemplary security code entry page of VIP Desktop in the browser, according to an embodiment of the present invention.

FIG. 10 depicts an exemplary security code entry page 1020 of VIP Desktop 400 in the browser 416, according to an embodiment of the present invention. In some embodiments, VIP Desktop 400 may not be able to auto-fill the security code 632. Therefore, the VIP credential window 628 is displayed along with the security code entry page 1020, and the user may be instructed to manually enter the security code 632 into the appropriate field, for example the security code field 626.

In some embodiments, the credential ID 630 may be selectively hidden or shown, for example by toggling a hide/show button 1040. In various embodiments, the user may select the default setting to show or hide the credential ID 630. In further embodiments, the user may use copy and paste functions within the user's computer 304 (FIG. 3) to copy the security code 632 and paste it into the security code field 626.

Figure 11:
FIG. 11 depicts exemplary automatic VIP Desktop and white page list updates, according to an embodiment of the present invention.

FIG. 11 depicts exemplary automatic VIP Desktop 400 and white page list 310 (FIG. 3) updates, according to an embodiment of the present invention. In an embodiment, the user may be prompted to initiate the automatic update, for example by selecting an "Update Now" button. In some embodiments, the automatic update may proceed automatically, without the need for user initiation. Thereafter, updates to VIP Desktop 400 and the white page list 310 (FIG. 3) will be automatically downloaded and installed.

For example, VIP Desktop 400 will check for updates and display a checking for updates window 1142. If a new update is available, the user may be asked if they wish to download and install the update in an available update window 1144. However, if no update is available, the user will be informed that no updates were available in a no update available window 1146.

In an embodiment, after the user has allowed the automatic update to proceed, a progress window 1148 may be displayed. The progress window allows the user to see that the update is proceeding, and may provide additional information, for example time remaining and download details, in some embodiments.

In some embodiments, there may be separate download and install windows. For example, the user may only be prompted to download the update in the available update window 1144. After the update has been downloaded, the user may be prompted again to allow the installation of the update in an installation window 1150. In some embodiments, the progress window 1148 may be displayed for the update download and/or the update installation.

In various embodiments, the user may be informed of the success or failure of the update. For example, if the update is successful, a successful update window 1152 may be displayed. However, if the update is unsuccessful, an unsuccessful window 1154 may be displayed.

Figure 12:
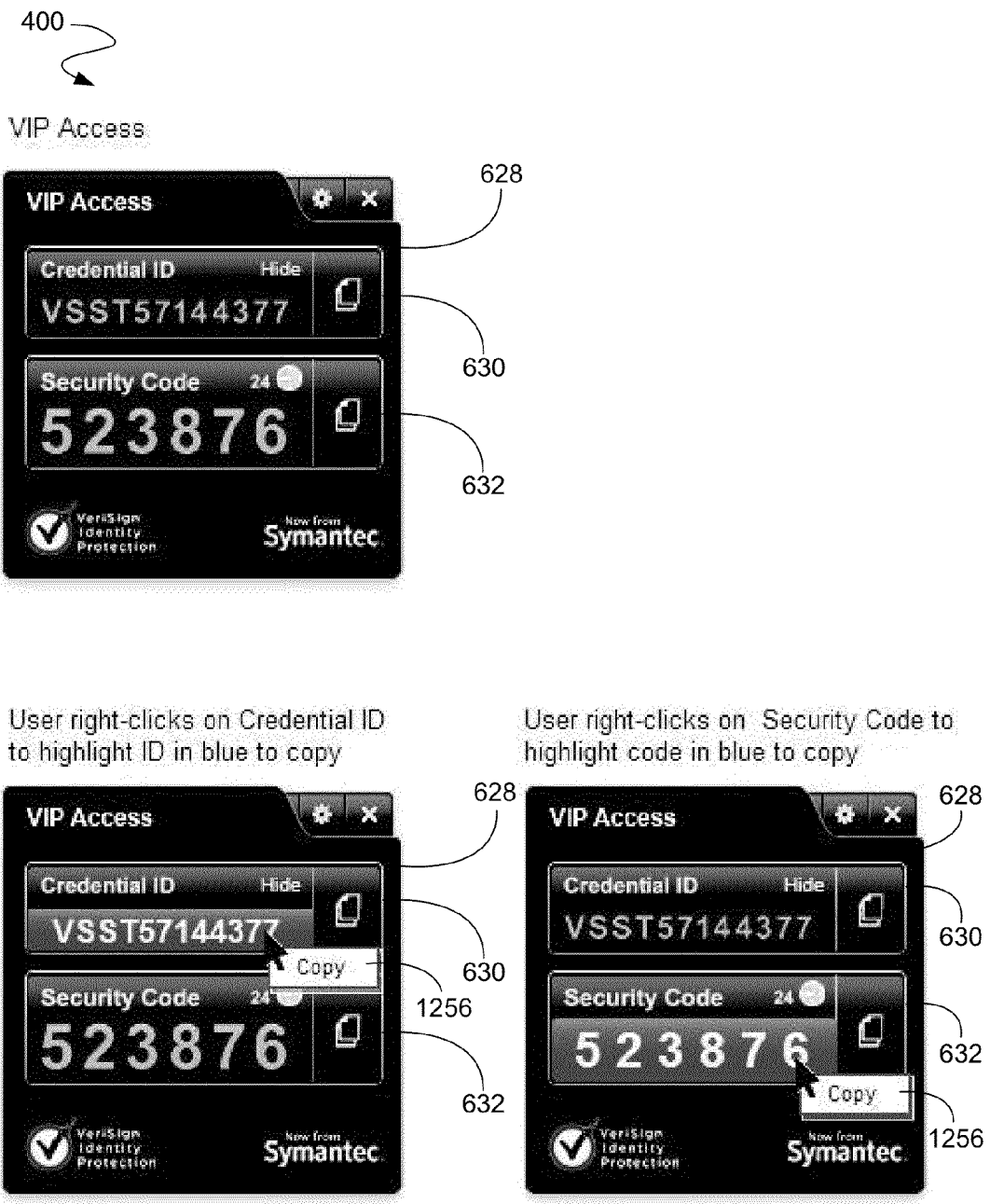
FIG. 12 depicts exemplary VIP credential windows for manually copying the security code and/or the credential ID, according to an embodiment of the present invention.

FIG. 12 depicts exemplary VIP credential windows 628 for manually copying the security code 632 and/or the credential ID 630, according to an embodiment of the present invention. In an embodiment, the user may click, e.g. right click using a mouse button, on the credential ID 630 or the security code 632. The credential ID 630 or the security code 632 may then be highlighted, e.g. highlighted in blue, to indicate selection. The user may copy the highlighted selection by selecting a copy command 1256. In various embodiments, the user may also copy the highlighted selection using keyboard shortcut commands.

Figure 13:
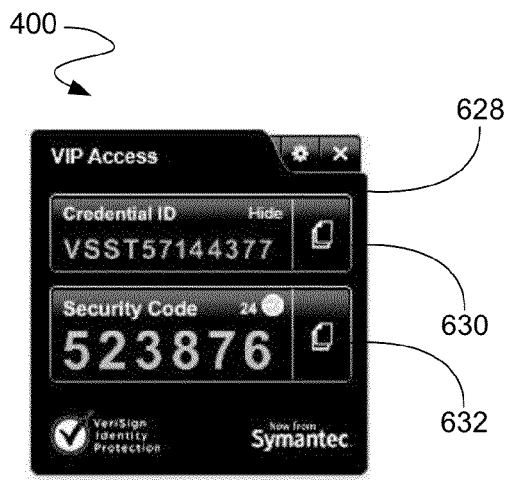
FIG. 13 depicts additional exemplary VIP credential windows for manually copying the security code and/or the credential ID, according to further embodiments of the present invention.
Figure 13:
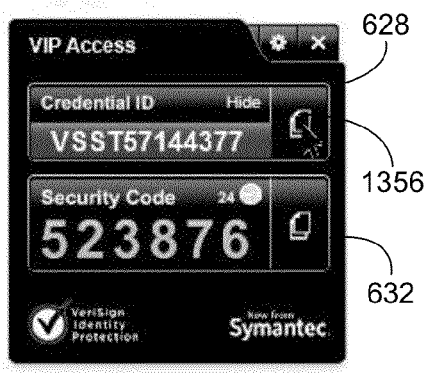
Figure 13:
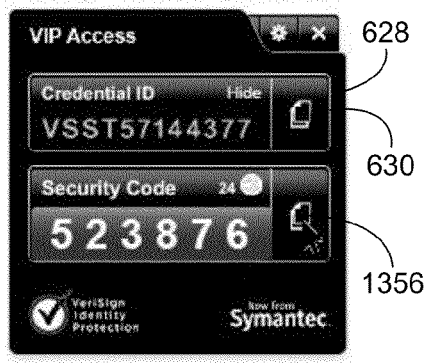
Figure 13:
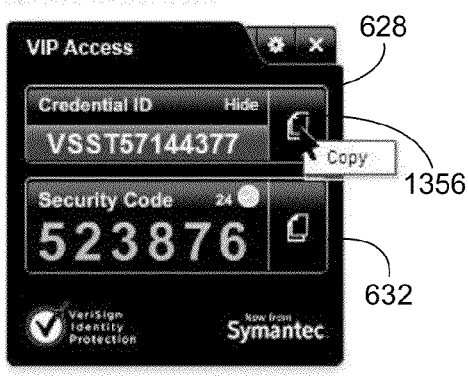
Figure 13:
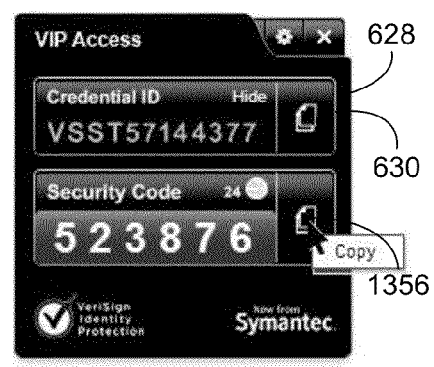

FIG. 13 depicts additional exemplary VIP credential windows 628 for manually copying the security code 632 and/or the credential ID 630, according to further embodiments of the present invention. In some embodiments, the user may move an on screen cursor to hover over a copy command icon 1356. The credential ID 630 or the security code 632 is then highlighted to indicate selection. The user may then click on the copy command icon 1356 to copy the credential ID 630 or the security code 632. In some embodiments, text is displayed, e.g. "Copy," to inform the user of the functionality of the copy command icon 1356.

Figure 14:
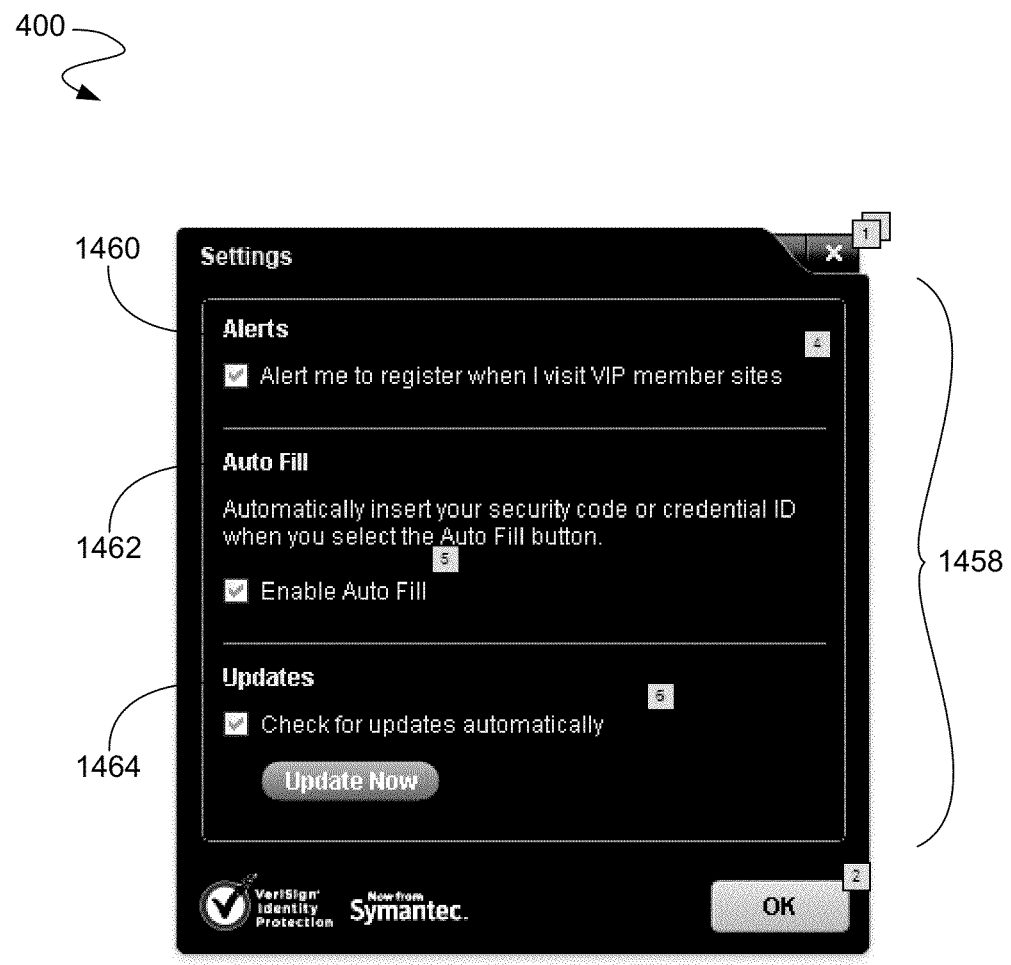
FIG. 14 depicts an exemplary settings window for manually setting options for VIP Desktop, according to an embodiment of the present invention.

FIG. 14 depicts exemplary an exemplary settings window 1428 for manually setting options 1458 for VIP Desktop 400, according to an embodiment of the present invention. In some embodiments, the options 1458 may include registration prompts 1460 that allow the user to select alerts to register when the user visits sites that use VIP Desktop 400. In various embodiments, the options 1458 may include an auto-fill option 1462 that allow the user to enable or disable automatic insertion of the security code 632 (FIG. 6) and/or the credential ID 630 (FIG. 6). In further embodiments, the options 1458 may include an automatic update option 1464 that allows the user to enable or disable automatic checks for updates. In addition, the automatic update option 1464 may include a selection that allows the user to "Update Now," thus forcing an immediate update, if available.

Figure 15:
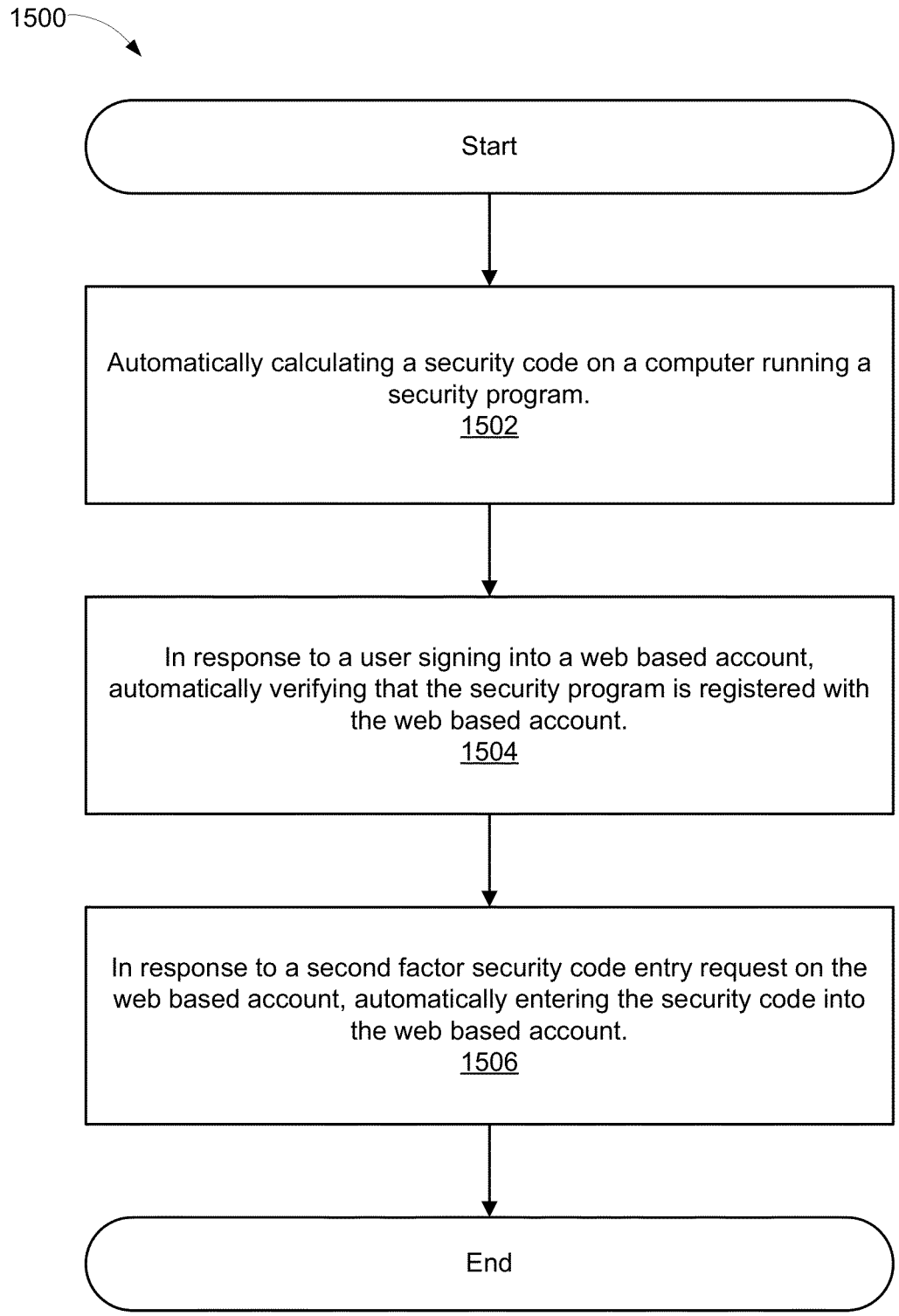
FIG. 15 depicts an exemplary computer controlled flow diagram of a method of automatically authenticating a user, according to an embodiment of the present invention.

FIG. 15 depicts a flowchart 1500 of an exemplary computer controlled method of automatically authenticating a user, according to an embodiment of the present invention. Although specific steps are disclosed in the flowchart 1500, such steps are exemplary. That is, embodiments of the present invention are well-suited to performing various other steps or variations of the steps recited in the flowchart 1500. The flowchart 1500 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1502, a security code is automatically calculated on a computer running a security program. This can be the same computer as used by the user to implement the browser. For example, in FIG. 3 an automatic authentication program running on a computer calculates a security code. In some embodiments the automatic authentication program may periodically generate a unique code using a formula that may include the authenticator's unique serial number and/or the present time. For example, in FIG. 3 the automatic authentication program may calculate a new security code every thirty seconds.

In a step 1504, in response to a user signing into a web based account, the security program automatically verifies that it is registered with the web based account. In some embodiments, the web based account is accessed with a browser running on the computer. In further embodiments, the activity of the browser is monitored. For example, in FIG. 4 VIP Desktop runs silently in the background and monitors the URLs the user enters into their browser. If the URL matches a VIP member site based on a white list VIP Desktop maintains, VIP Desktop activates. If VIP Desktop is registered with the URL, the security code may be automatically transmitted. If VIP Desktop is not registered with the URL, the user may be prompted to register.

In a step 1506, in response to a second factor security code entry request on the web based account, automatically entering the security code into the web based account. For example, in FIG. 9 VIP Desktop has been registered to the user's account. When the user signs into their account, VIP Desktop waits for a second factor security code entry page. VIP Desktop then automatically enters the security code into the security code entry page.

In various embodiments, automatically entering the security code occurs after the user has provided a user name and user password. For example, in FIG. 9, VIP Desktop waits for the user to begin signing onto the user's account by entering a user name and password. Once the user name and password have been entered, VIP Desktop automatically transmits the security code.

In some embodiments, a list of web pages that generate the second factor security code entry request is maintained. For example, in FIG. 3 the automatic authentication program periodically downloads a white page list of web sites that require or have the option of enabling the use of the automatic authentication program.

In various embodiments, the user is prompted to register the security program with unregistered web based accounts. For example, in FIG. 4 VIP Desktop monitors the URLs the user enters into their browser. If a URL is unregistered and is included within the white page list, VIP Desktop asks the user if they want to protect their login with VIP Desktop. If the user agrees, VIP Desktop is registered to the account.

In certain embodiments, a list of web sites that generate the second factor security code entry request is maintained, and for a particular web site, a web page that generates the second factor security code entry request is maintained. For example, in FIG. 3 the automatic authentication program periodically downloads a white page list of web sites that require or have the option of enabling the use of the automatic authentication program. The white page list may also include the location within one or more of the web sites where the security code is required.

In some embodiments, in response to a failure of automatically entering the security code, the user is prompted to manually enter the security code. For example, in FIG. 10 VIP Desktop is unable to auto-fill the security code. Therefore, the VIP credential window is displayed along with the security code entry page. In addition, the user may be instructed to manually enter the security code into the security code field.

Figure 16:
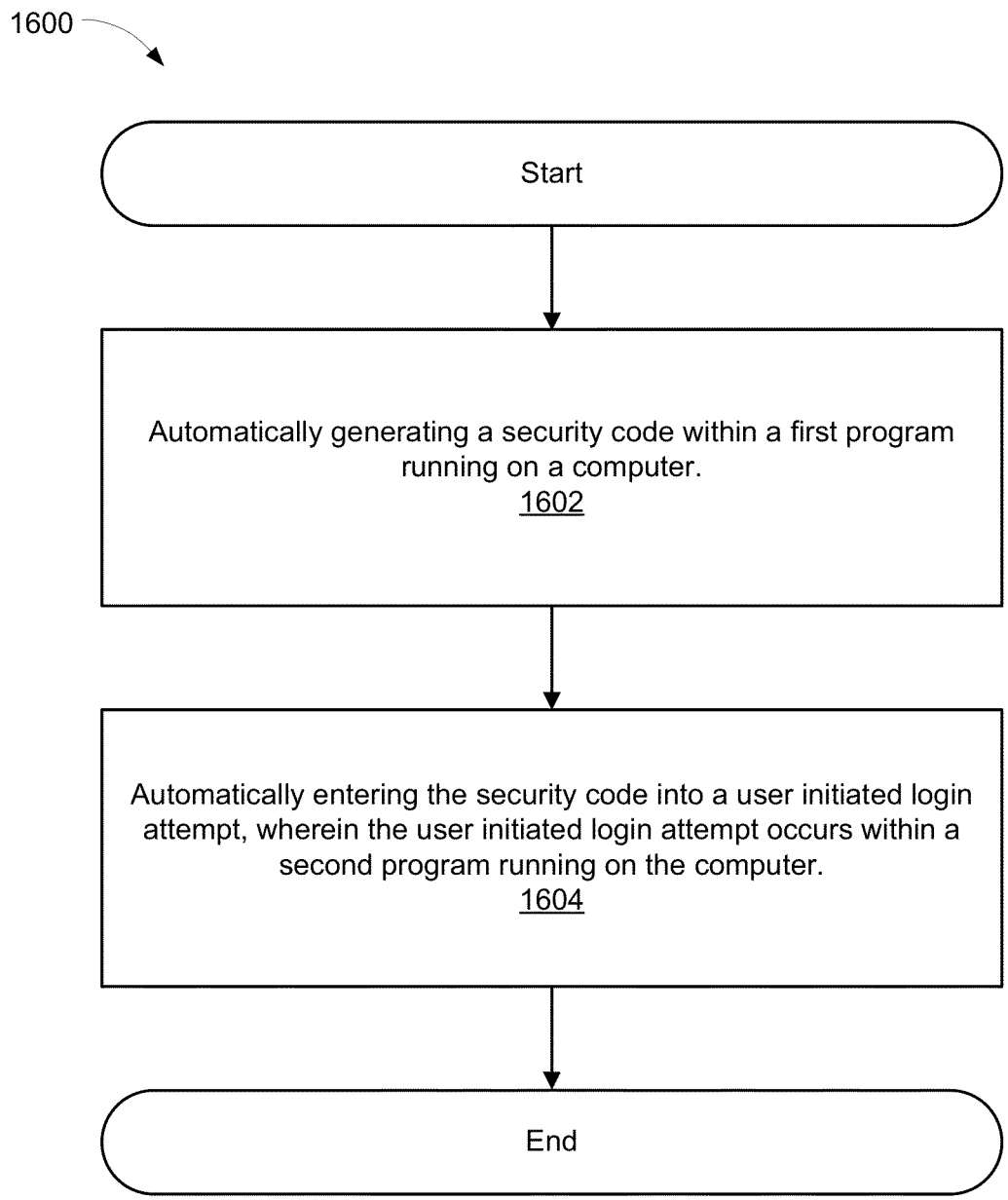
FIG. 16 depicts an exemplary computer controlled flow diagram of a method of authenticating a login attempt, according to an embodiment of the present invention.

FIG. 16 depicts a flowchart 1600 of an exemplary computer controlled method of authenticating a login attempt, according to an embodiment of the present invention. Although specific steps are disclosed in the flowchart 1600, such steps are exemplary. That is, embodiments of the present invention are well-suited to performing various other steps or variations of the steps recited in the flowchart 1600. The flowchart 1600 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1602, a security code is automatically generated within a first program running on a computer running a security program. For example, in FIG. 3 an automatic authentication program running on a computer calculates a security code. In some embodiments the automatic authentication program may periodically generate a unique code using a formula that may include the authenticator's unique serial number and/or the present time. For example, in FIG. 3 the automatic authentication program may calculate a new security code every thirty seconds.

In a step 1604, the security code is automatically entered into a user initiated login attempt transparently to the user, wherein the user initiated login attempt occurs within a second program running on the computer. In some embodiments, the second program is a web browser. In further embodiments, the URLs a user enters into the web browser are automatically monitored. For example, in FIG. 4 VIP Desktop runs silently in the background and monitors the URLs the user enters into their browser. If the URL matches a VIP member site based on a white list VIP Desktop maintains, VIP Desktop activates. If VIP Desktop is registered with the URL, the security code may be automatically transmitted. If VIP Desktop is not registered with the URL, the user may be prompted to register.

In various embodiments, automatically entering the security code occurs in response to the user providing a user name and user password. For example, in FIG. 9, VIP Desktop waits for the user to begin signing onto the user's account by entering a user name and password. Once the user name and password have been entered, VIP Desktop automatically transmits the security code.

In some embodiments, a list of URLs that required the security code is maintained. For example, in FIG. 3 the automatic authentication program periodically downloads a white page list of web sites that require or have the option of enabling the use of the automatic authentication program.

In various embodiments, the user is prompted to register the first program with unregistered URLs. For example, in FIG. 4 VIP Desktop monitors the URLs the user enters into their browser. If a URL is unregistered and is included within the white page list, VIP Desktop asks the user if they want to protect their login with VIP Desktop. If the user agrees, VIP Desktop is registered to the account.

In certain embodiments, a list of web sites that generate a security code request is maintained, and for a particular web site, a web page that generates the security code request is automatically determined. For example, in FIG. 3 the automatic authentication program periodically downloads a white page list of web sites that require or have the option of enabling the use of the automatic authentication program. The white page list may also include the location within one or more of the web sites where the security code is required.

In some embodiments, in response to a failure of automatically entering the security code, the user is prompted to manually enter the security code. For example, in FIG. 10 VIP Desktop is unable to auto-fill the security code. Therefore, the VIP credential window is displayed along with the security code entry page. In addition, the user may be instructed to manually enter the security code into the security code field.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of authenticating a user, the method comprising:
    automatically calculating a security code on a computer running a security program;
    monitoring, by the security program, a uniform resource locator (URL) entered by a user into a browser executing on the computer to access a web based account, wherein the web based account requires a login process for authentication of the user and generates a second factor security code entry request in connection with the login process;
    automatically verifying whether the security program is registered with the web based account; and
    automatically transmitting the security code by the security program to the web based account during the login process when the security program is registered with the web based account, wherein the security code is automatically transmitted to the web based account without the user manually entering the security code into the browser, wherein the automatically transmitting comprises:
        automatically entering the security code into the browser when the security program is registered with the web based account; and
        determining that the user has provided a user name and a user password, and wherein the automatically entering occurs after the user has provided the user name and the user password.

2. The method of claim 1 wherein the security program calculates the security code periodically.

3. The method of claim 1 further comprising automatically monitoring activity of the browser.

4. The method of claim 1 further comprising maintaining a list of web pages that generate the second factor security code entry request, and prompting the user to register the security program with unregistered web based accounts.

5. The method of claim 1 further comprising:
    maintaining a list of web sites that generate the second factor security code entry request, and
    for a particular web site, automatically determining a web page that generates the second factor security code entry request.

6. The method of claim 1 further comprising, in response to a failure of the automatically entering the security code, prompting the user to manually enter the security code.

7. A method of authenticating a login attempt, the method comprising:
    automatically generating a security code within a first program running on a computer;
    identifying, by the first program, a user initiated login attempt by a second program running on the computer;
    automatically entering the security code into the user initiated login attempt when identified by the first program, wherein the automatically entering is performed without a user manually entering the security code into the user initiated login attempt; and
    determining that the user has provided a user name and a user password in the user initiated login attempt, and wherein the automatically entering occurs in response to the user providing the user name and the user password.

8. The method of claim 7 wherein the first program periodically generates a new security code.

9. The method of claim 7 wherein the second program is a web browser, and further comprising automatically monitoring uniform resource locators (URLs) the user enters into the web browser.

10. The method of claim 7 further comprising maintaining a list of uniform resource locators (URLs) that require the security code, and prompting the user to register the first program with unregistered URLs.

11. The method of claim 7 further comprising:
    maintaining a list of web sites within the first program that generate a security code request, and for a particular web site, automatically determining from the list a web page that generates the security code request.

12. The method of claim 7 further comprising, in response to a failure of the automatically entering the security code, prompting the user to manually enter the security code.

13. A system comprising:
a processor;
a display;
memory coupled to the processor, wherein the memory comprises instructions that when executed cause the system to perform a method of authenticating a login attempt, the method comprising:
automatically generating a security code within a first program running on a computer;
in response to a user navigating to a uniform resource locator (URL) within a second program running on the computer, automatically verifying that the first program is registered with the URL;
identifying, by the first program, a user initiated login attempt within the second program;
automatically transmitting the security code into the user initiated login attempt by the second program when the first program is registered with the URL; and
determining that the user has provided a user name and a user password in the user initiated login attempt, and wherein the automatically transmitting occurs in response to the user providing the user name and the user password.

14. The system of claim 13 wherein the first program automatically generates a new security code periodically.

15. The system of claim 13 wherein the second program is a web browser, and wherein the method further comprises automatically monitoring URLs the user enters into the web browser.

16. The system of claim 13 wherein the method further comprises automatically searching the URL for a location that requires the security code.

17. The system of claim 13 wherein the method further comprises, in response to a failure of the automatically transmitting the security code, prompting the user to manually enter the security code.

* * * * *